US010591147B2

United States Patent
Devappa et al.

(10) Patent No.: US 10,591,147 B2
(45) Date of Patent: Mar. 17, 2020

(54) CONNECTION MECHANISM

(71) Applicant: Appleton Grp LLC, Rosemont, IL (US)

(72) Inventors: Harsha N. Devappa, Pune (IN); Vinaya N. Kubsad, Pune (IN); Santosh K. Patil, Pune (IN); Timothy E. Graff, Arlington Heights, IL (US)

(73) Assignee: Appleton Grp LLC., Rosemont, IL (US)

( * ) Notice: Subject to any disclaimer, the term of this patent is extended or adjusted under 35 U.S.C. 154(b) by 296 days.

(21) Appl. No.: 15/448,104

(22) Filed: Mar. 2, 2017

(65) Prior Publication Data

US 2018/0003368 A1   Jan. 4, 2018

(30) Foreign Application Priority Data

Jun. 30, 2016   (IN) .............................. 201621022590

(51) Int. Cl.
*F16B 7/20*   (2006.01)
*F21V 21/116*   (2006.01)
(Continued)

(52) U.S. Cl.
CPC .............. *F21V 21/116* (2013.01); *F16B 7/20* (2013.01); *F16B 21/04* (2013.01); *F21V 17/14* (2013.01); *F21V 27/02* (2013.01); *F21Y 2115/10* (2016.08)

(58) Field of Classification Search
CPC ........ F16L 37/248; F16L 37/252; F16L 37/24
(Continued)

(56) References Cited

U.S. PATENT DOCUMENTS 582,611 A * 5/1897 Anderson ............. F16L 37/248
285/148.2
628,765 A * 7/1899 Collette ................ F16L 37/252
285/81
(Continued)

FOREIGN PATENT DOCUMENTS

CN     204437980    7/2015
EP       2284440    2/2011
(Continued)

OTHER PUBLICATIONS

International Searching Authority, International Search Report and Written Opinion dated Jun. 12, 2017, issued in connection with International Application No. PCT/US2017/023874, filed on Mar. 23, 2017, 9 pages.

(Continued)

*Primary Examiner* — Aaron M Dunwoody
(74) *Attorney, Agent, or Firm* — McDonnell Boehnen Hulbert & Berghoff LLP

(57) ABSTRACT

A connection mechanism for connecting a first element to a second element including a plurality of bayonet tabs configured on one of said first element and said second element; and a plurality of bayonet slots engageable with the plurality of bayonet tabs, the plurality of bayonet slots configured on one of the first element and the second element that does not contain the plurality of bayonet tabs, wherein the plurality of bayonet tabs are aligned with the plurality of bayonet slots, subsequent to which, the first element is partially rotated with respect to the second element to facilitate the reception of the plurality of bayonet tabs within the plurality of slots, thereby providing a connection between the first and second elements.

9 Claims, 7 Drawing Sheets

(51) Int. Cl.
*F21V 17/14* (2006.01)
*F16B 21/04* (2006.01)
*F21Y 115/10* (2016.01)
*F21V 27/02* (2006.01)

(58) Field of Classification Search
USPC ................................. 285/401, 402, 360, 361
See application file for complete search history.

(56) References Cited

U.S. PATENT DOCUMENTS

| | | | | |
|---|---|---|---|---|
| 682,797 | A * | 9/1901 | Grayson | F16L 37/252 251/149 |
| 825,354 | A * | 7/1906 | Schnoor | F16L 37/252 285/360 |
| 917,204 | A * | 4/1909 | Walther | F16L 37/252 285/360 |
| 959,226 | A * | 5/1910 | Keys | F16L 37/252 285/361 |
| 1,072,736 | A * | 9/1913 | Kelly | F16L 37/252 285/374 |
| 1,244,666 | A * | 10/1917 | Welker | F16L 37/252 285/352 |
| 1,525,794 | A * | 2/1925 | Blake | F16L 37/252 285/148.1 |
| 1,591,871 | A * | 7/1926 | Heinrich | F16L 37/248 285/331 |
| 1,805,580 | A * | 5/1931 | Hazlett | F16L 37/252 251/149 |
| 1,971,578 | A * | 8/1934 | Richardson | F16L 37/113 279/9.1 |
| 2,383,249 | A * | 8/1945 | Hardwick | F16L 29/00 251/149.5 |
| 2,819,097 | A * | 1/1958 | Lang | F16L 37/252 285/102 |
| 2,918,259 | A * | 12/1959 | Bus, Sr. | E21B 17/06 166/237 |
| 3,154,242 | A * | 10/1964 | Harris | F04D 29/626 285/360 |
| 3,217,746 | A * | 11/1965 | Voisine | F16L 37/107 137/614.04 |
| 3,709,526 | A * | 1/1973 | Cromie | F16L 3/10 285/73 |
| 3,813,115 | A * | 5/1974 | French | B29C 49/44 285/355 |
| 3,851,982 | A | 12/1974 | See | |
| 5,174,642 | A | 12/1992 | Brohard et al. | |
| 6,634,901 | B2 | 10/2003 | Kerr, Jr. | |
| 6,763,701 | B1 * | 7/2004 | Moretz | F16L 37/252 285/362 |
| 6,764,103 | B1 * | 7/2004 | Moretz | E21B 17/02 285/361 |
| 7,997,761 | B2 | 8/2011 | Peck et al. | |
| D693,501 | S | 11/2013 | Kochman | |
| 8,764,243 | B2 | 7/2014 | Zimmer et al. | |
| 8,911,116 | B2 | 12/2014 | Blincoe et al. | |
| 9,022,621 | B2 | 5/2015 | Boyer et al. | |
| 2003/0107218 | A1 * | 6/2003 | Anderson | B60K 15/04 285/360 |
| 2004/0173515 | A1 * | 9/2004 | Nakanishi | A61M 39/1011 210/232 |
| 2008/0093846 | A1 * | 4/2008 | Sparks | F16L 37/0847 285/330 |
| 2012/0074146 | A1 * | 3/2012 | Kunishige | A61M 39/1011 220/315 |
| 2012/0218748 | A1 | 8/2012 | Conrad | |
| 2013/0279166 | A1 | 10/2013 | Yoo | |
| 2013/0320672 | A1 * | 12/2013 | Steele | F16L 37/0982 285/305 |
| 2014/0211457 | A1 | 7/2014 | Tarsa et al. | |

FOREIGN PATENT DOCUMENTS

| | | |
|---|---|---|
| JP | S4960171 | 5/1974 |
| JP | H01159624 | 6/1989 |
| JP | 2015028862 | 2/2015 |

OTHER PUBLICATIONS

Arran LED Floodlight, CH-DS-ARRAN-IND-V3, Sep. 2015, http://www.chalmit.com/more/on/details/00072, 2 pages.
Chalmit, LED Solutions, 2015, http://www.gunneman.nl/wp-content/uploads/2015/05/Chalmit-LED-Solutions.pdf, 36 pages.
Champ® FMV Series LED Floodlight Fixtures, http://www.cooperindustries.com/content/public/en/crouse-hinds/products/lighting/led_luminaires/champ_fmv_led_series_floodlight_fixtures.html, downloaded Aug. 16, 2016, 10 pages.
Dialight LED Lighting Fixture Catalogue for Industrial and Hazardous Areas, Feb. 2016, 60 pages.
Hadar Lighting, HDL206E—Emergency Modular LED Luminaire, https://www.google.com/search?q=Modular+LED+Luminaire&tbm=isch&tbo=u&source=univ&sa=X&ved=0ahUKEwi11eGS5p7NAhUQPVIKHcSqALwQsAQIHQ&biw=1920&bih=973#imgrc=jEy1aGRccvMuiM%3A, downloaded Aug. 16, 2016, 1 page.
17,500 Lumen C1D1 Explosion Proof 150 Watt High Bay LED Light Fixture—Paint Spray Booth Approved, Spec Sheet, http://www.larsonelectronics.com/p-70368-class-1-division-1-explosion-proof-150-watt-high-bay-led-light-fixture-paint-spray-booth-approved.aspx, downloaded Aug. 16, 2016, 7 pages.
Hazardous Location LED Fixture, 240W, https://www.zoro.com/larson-electronics-llc-hazardous-location-led-fixture-240w-hal-hb-240w-rsled/i/G8021937/, downloaded Aug. 16, 2016, 5 pages.
"SafeSite LED Floodlight—UL 844 for Indoor and Outdoor Hazardous Applications," Dialight, MDTEXSSCIDIIFLX001_K, www.dialight.com, pre-2016 Dialight Brochure, 12 pages.
Wikipedia, "Bayonet mount," https://en.wikipedia.org/wiki/Bayonet_mount, 2017, 5 pages.
First Examination Report (FER) for Indian Patent Application No. 201621022590 dated Jun. 6, 2019, pp. 1-5.

* cited by examiner

CONNECTION MECHANISM

FIELD

The present disclosure relates to the field of mechanical engineering. In particular, the present disclosure relates to the field of connection mechanisms.

BACKGROUND

Conventional connection mechanisms utilized in mounting of lighting fixtures involve the use of threaded connections. A lighting fixture for hazardous applications, typically including an LED matrix, is a heavy piece of equipment. One conventional connection mechanism includes an adaptor mounted on the lighting fixture and configured to be threadably received by a hood configured on a mounting pole. The threadable reception of the adaptor into the hood is a difficult task since it involves rotating the entire lighting fixture. The lighting fixture, typically, weighs around 35 pounds. Rotating such a heavy piece of equipment, generally eight to ten times until a secure fitment is established between the adaptor and the hood, is extremely difficult for a human operator. Furthermore, if the adaptor and the hood are not aligned properly, cross-threading may occur which can damage the threads. Furthermore, the rotation of the adaptor relative to the hood can also cause undesired twisting of the cables contained therewithin.

Hence, in order to overcome the aforementioned drawbacks, there is a need for a connection mechanism which significantly reduces the effort involved in mounting of lighting fixtures, and that does not cause undesired twisting of the cables contained therewithin, or damage to the threads of a threaded connection.

OBJECTS

Some of the objects of the present disclosure, which at least one embodiment herein satisfies, are as follows.

It is an object of the present disclosure to ameliorate one or more problems of the prior art or to at least provide a useful alternative.

An object of the present disclosure is to provide a connection mechanism that reduces the effort associated with the mounting of lighting fixtures as compared with the conventional connection mechanisms.

Another object of the present disclosure is to provide a connection mechanism that does not cause undesired twisting of cables, or damage to the threads of a threaded connection.

Other objects and advantages of the present disclosure will be more apparent from the following description, which is not intended to limit the scope of the present disclosure.

SUMMARY

The present disclosure envisages a connection mechanism for connecting a first element to a second element. The connection mechanism comprises a plurality of bayonet tabs configured on one of the first element and the second element, and a plurality of bayonet slots engageable with the plurality of bayonet tabs. The plurality of bayonet slots is configured on remaining one of the first element and the second element, wherein the plurality of bayonet tabs is aligned with the plurality of bayonet slots, subsequent to which, the one of the first element and the second element is partially rotated with respect to the remaining one of the first element and the second element to facilitate the reception of the plurality of bayonet tabs within the plurality of slots, thereby providing a connection between the first element and the second element.

In an embodiment, the plurality of bayonet tabs has a first portion having a partly tapered profile. A second portion extends from the first portion and has a rectangular profile. A third portion extends from the second portion and has a rectangular profile, wherein the width of the third portion is greater than the width of the second portion. The partly tapered profile of the first portion is defined by an inclined portion and a stepped portion extending from the inclined portion. The stepped portion provides a locking feature to one of the first element and the second element, on which the plurality of tabs is configured.

In another embodiment, an angle by which the one of the first element and the second element is partially rotated with respect to the remaining one of the first element and the second element ranges from 25° to 50°. In a preferred embodiment, the angle by which the one of the first element and the second element is partially rotated with respect to the remaining one of the first element and the second element is 40°.

In another embodiment, an angle of taper of the first portion with respect to a longitudinal axis of the plurality of bayonet tabs ranges from 5° to 30°. In a preferred embodiment, the angle of taper of the first portion with respect to the longitudinal axis of the tab is 20°.

In another embodiment, the first element is an adaptor coupled to a LED matrix housing and extending therefrom.

In another embodiment, the second element is a hood configured on an operative end of a mounting conduit, the hood configured to receive the adaptor, thereby facilitating connection between the LED matrix housing and the mounting conduit.

In an embodiment, an operative top edge of the adaptor is provided with a chamfer, wherein an angle of chamfer of the chamfer ranges from 53° to 58°, the chamfer facilitates a reception of a gasket on the operative top edge operatively between the adaptor and the hood.

BRIEF DESCRIPTION OF ACCOMPANYING DRAWING

A connection mechanism of the present disclosure, will now be described with the help of the non-limiting accompanying drawing, in which.

DETAILED DESCRIPTION

Figure 1A:
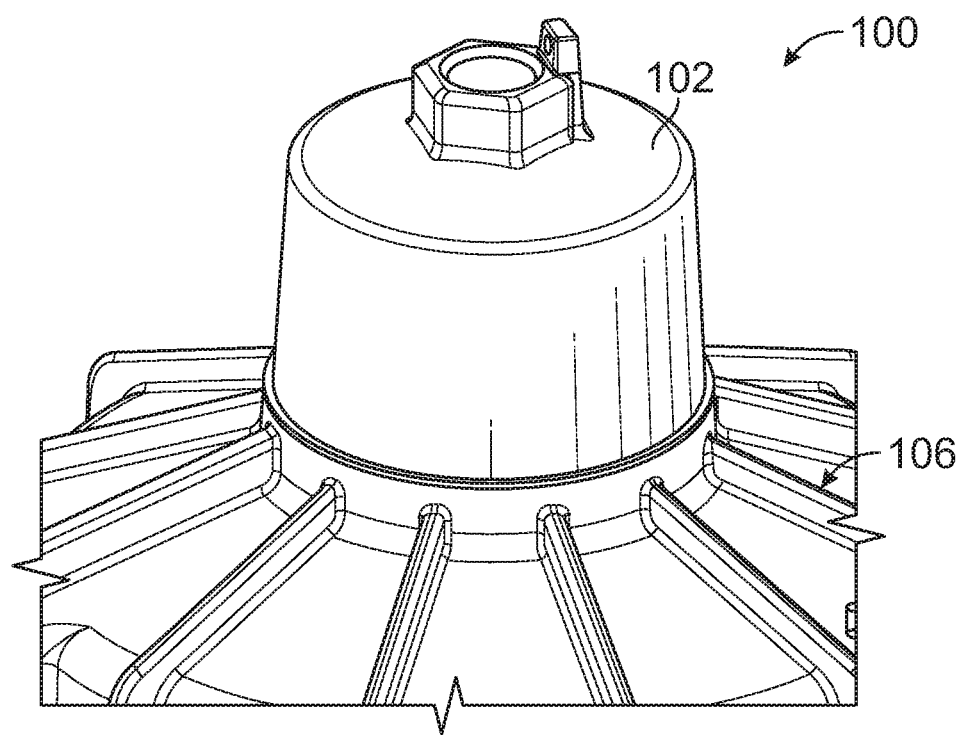
FIG. 1A and FIG. 1B illustrate different views of a conventional connection mechanism for a lighting fixture.
Figure 1B:
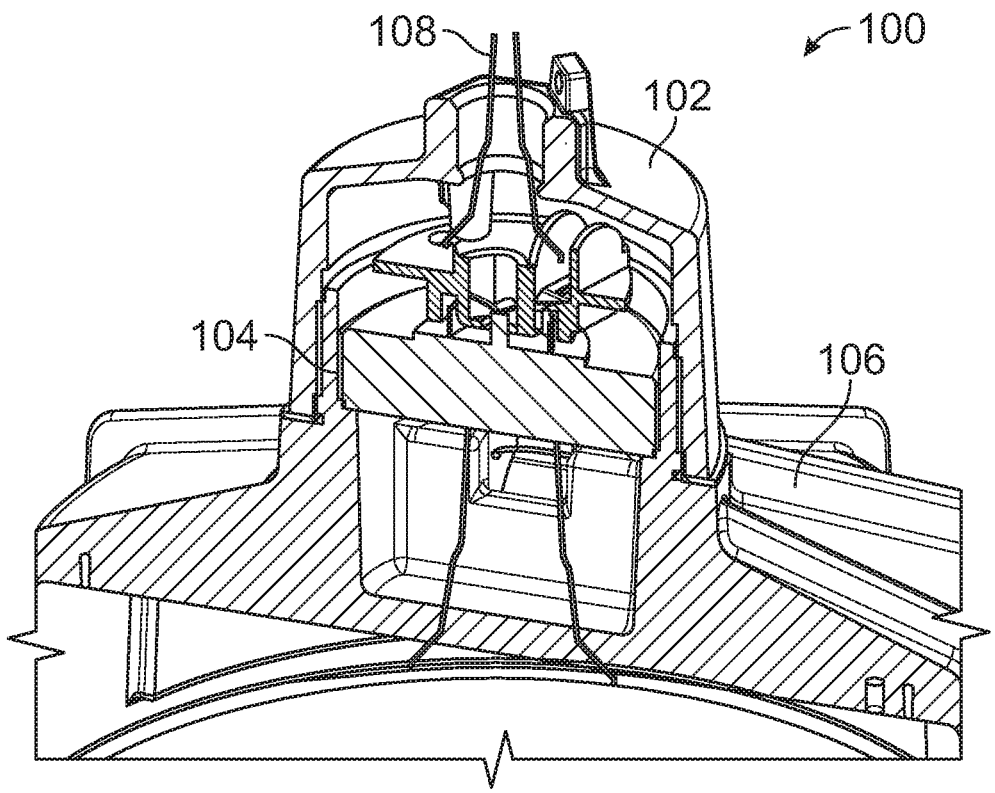

FIG. 1A and FIG. 1B illustrate different views of a conventional connection mechanism for a lighting fixture 106. As seen in FIG. 1, the conventional connection mechanism 100 (also referred to as conventional mechanism 100) includes a hood 102 and an adaptor 104 that extends from the lighting fixture 106. Typically, the hood 102 is configured at an operative end of a mounting pole/conduit (not seen in figures). The hood 102 and the adaptor 104 are typically configured for threadable connection. For establishing a secure threaded connection between the hood 102 and the adaptor 104, it is required to rotate the adaptor 104 along with the lighting fixture 106, at least eight to ten times, depending upon the number of thread formations configured on the adaptor 104 and the hood 102. A lighting fixture typically for hazardous applications involving a usage of an LED matrix generally weighs in the range of thirty to forty pounds. Rotating such a heavy piece of equipment is an extremely difficult task for the human operators. Furthermore, the rotation of the adaptor 104 with respect to the hood can also cause undesired twisting of the cables 108, or damage to the threads of the threaded connection.

Figure 2A:
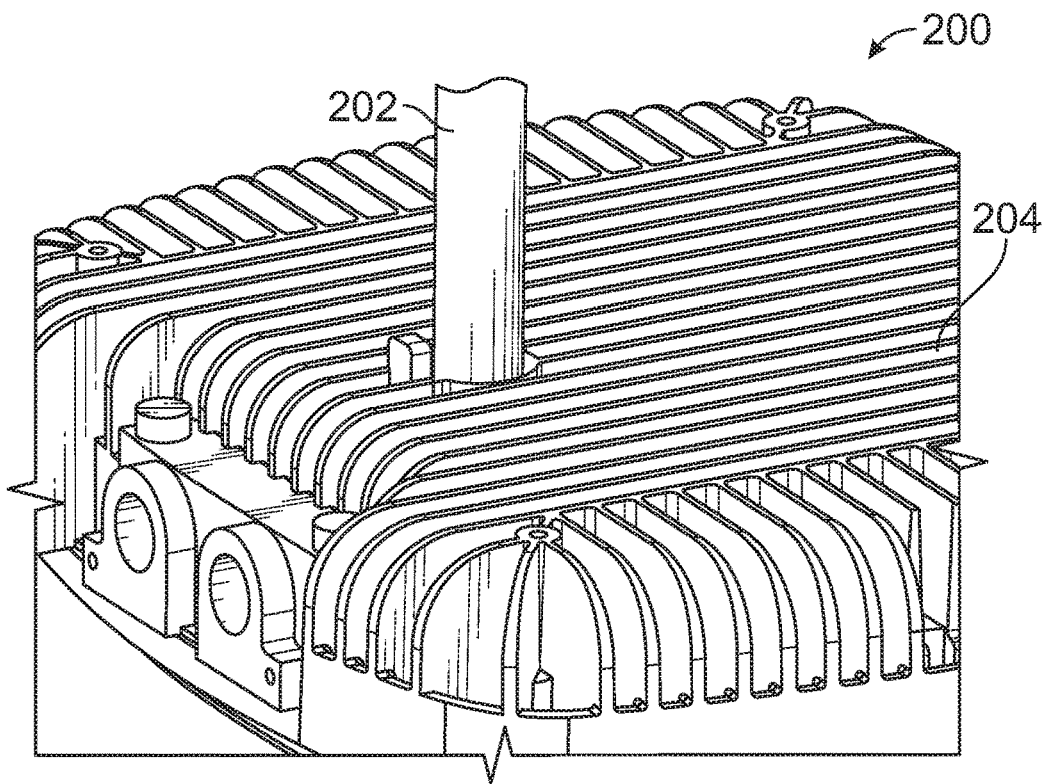
FIG. 2A and FIG. 2B illustrate different views of another conventional connection mechanism for a lighting fixture.
Figure 2B:
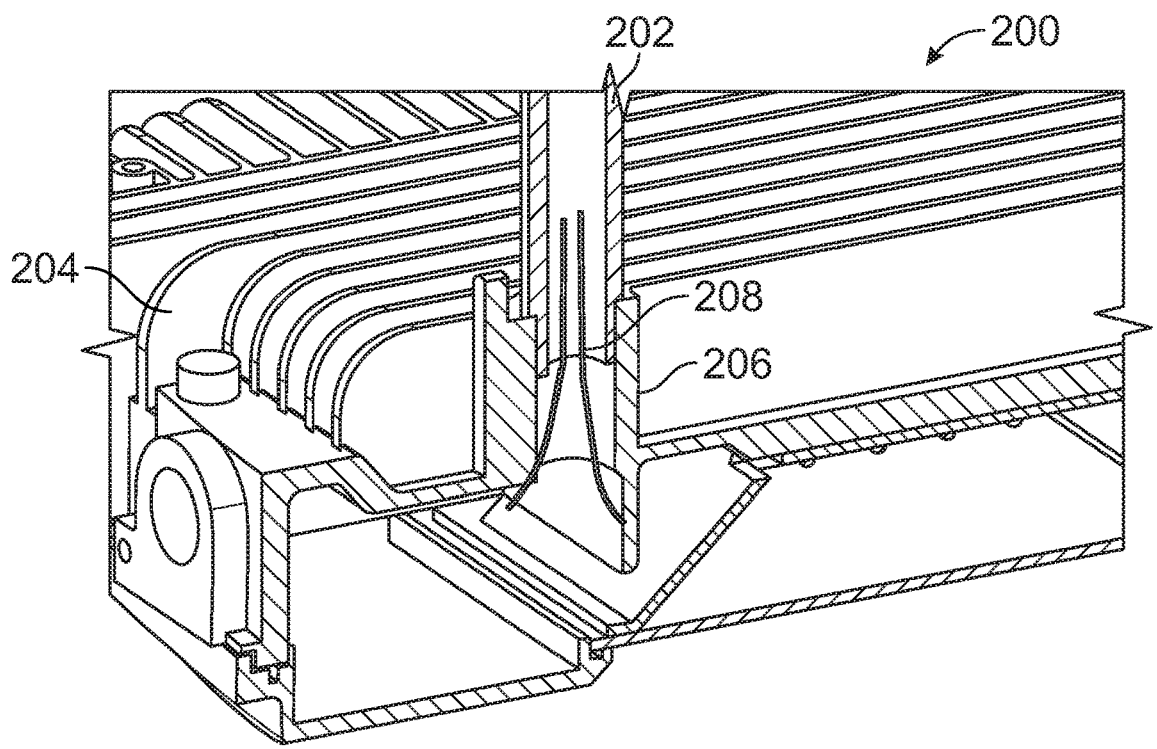

FIG. 2A and FIG. 2B illustrate different views of another conventional connection mechanism 200 (also referred to as conventional mechanism 200) for lighting fixtures. The conventional mechanism 200 is a very simple mechanism which includes a mounting conduit 202 having threaded formations configured on an operative end thereof. A lighting fixture housing 204 has a threaded connector portion 206 configured thereon. The threaded connector portion 206 is configured to be threadably received onto the operative end of the mounting conduit 202. The threadable reception of the threaded connector portion 206 over the mounting conduit 202 involves the rotation of the entire lighting fixture housing 204, which is a cumbersome task. Furthermore, the rotation of the lighting fixture housing 204 can also cause an undesired twisting of the cables 208, or damage to the threads of the threaded connection.

The present disclosure envisages a connection mechanism that overcomes the aforementioned drawbacks associated with the conventional mechanisms 100, 200. The connection mechanism of the present disclosure significantly reduces the effort associated with the mounting of lighting fixtures. Furthermore, the connection mechanism of the present disclosure is configured so as to prevent unwanted twisting of the cables of the lighting fixture, and does not include a threaded connection. As such, any damage to threads of a threaded connection is eliminated.

Figure 3:
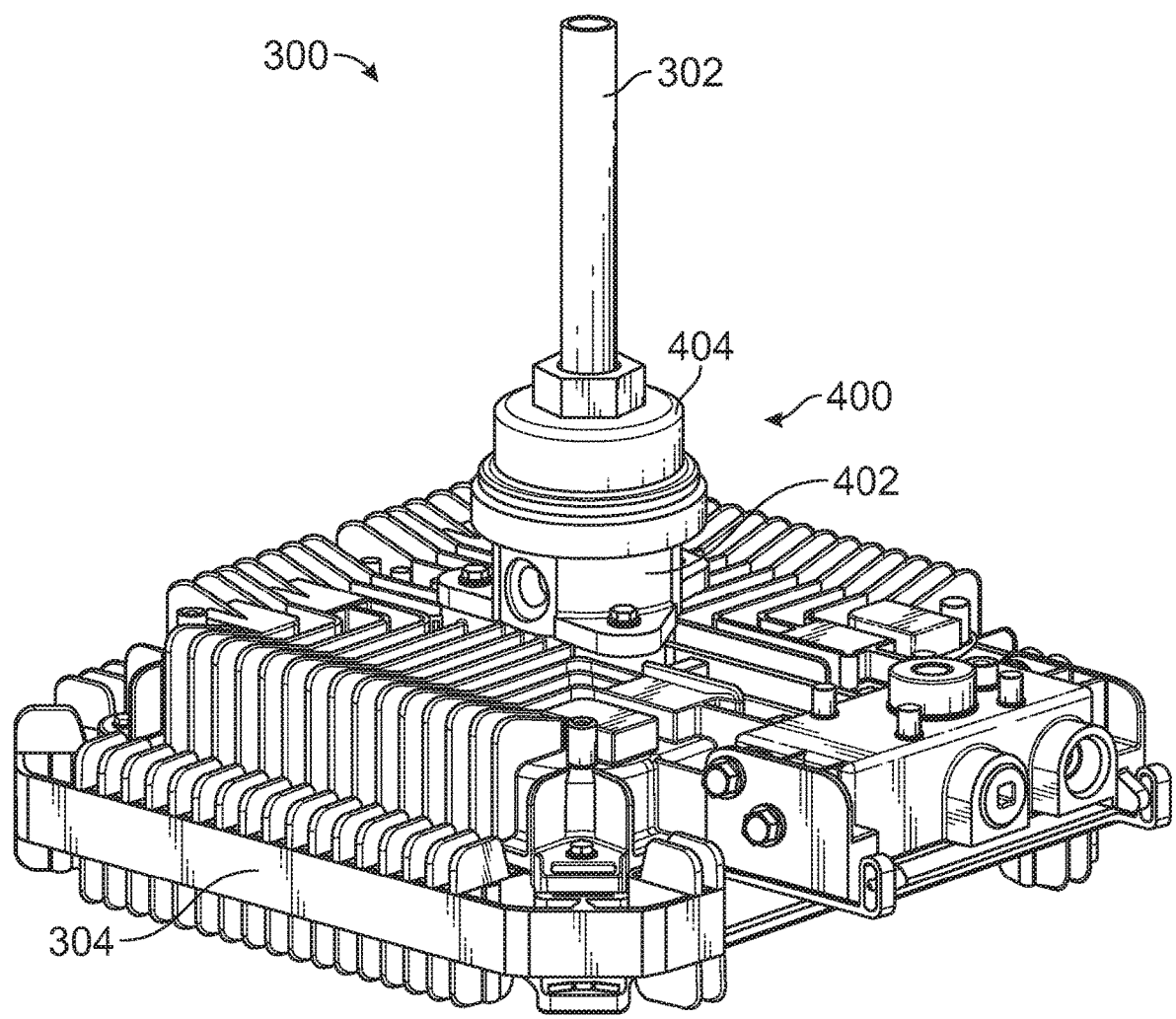
FIG. 3 illustrates an isometric view of a lighting fixture which employs a connection mechanism in accordance with an embodiment of the present disclosure.
Figure 4:
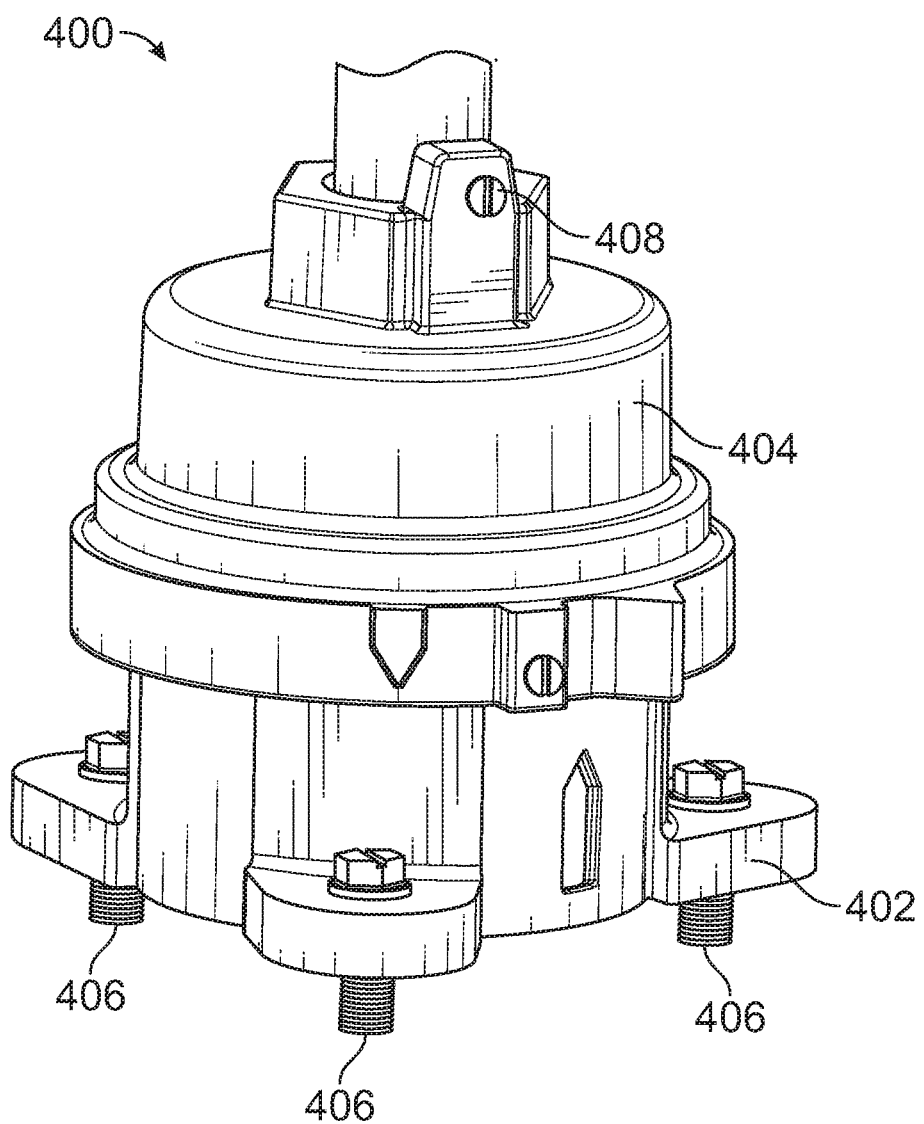
FIG. 4 illustrates an isometric view of the connection mechanism seen in FIG. 3.

FIG. 3 illustrates an isometric view of a lighting fixture 300 which employs a connection mechanism 400, in accordance with an embodiment of the present disclosure. FIG. 4 illustrates an isometric view of the connection mechanism 400. Referring to FIG. 3 and FIG. 4, the lighting fixture 300 includes a mounting conduit pipe 302 and a LED matrix housing 304. The LED matrix housing 304 is coupled to the mounting conduit pipe 302 via the connection mechanism 400. The connection mechanism 400 comprises an adaptor 402 (also referred to as first element 402) that is received within a hood 404 (also referred to as second element 404). As seen in FIG. 3, the adaptor 402 is configured on the LED matrix housing 304, while the hood 404 is configured on an operative end of the mounting conduit pipe 302. The connection of the adaptor 402 with the hood 404 facilitates the mounting of the LED matrix housing 304 onto the mounting conduit pipe 302.

In an embodiment, the adaptor 402 is fastened to the LED matrix housing 304 via screws 406. In another embodiment, the adaptor 402 can be integral with the LED matrix housing 304.

In an embodiment, the hood 404 is fastened to the mounting conduit pipe 302 via screw 408. In another embodiment, the hood 404 can be integral with the mounting conduit pipe 302.

Figure 5A:
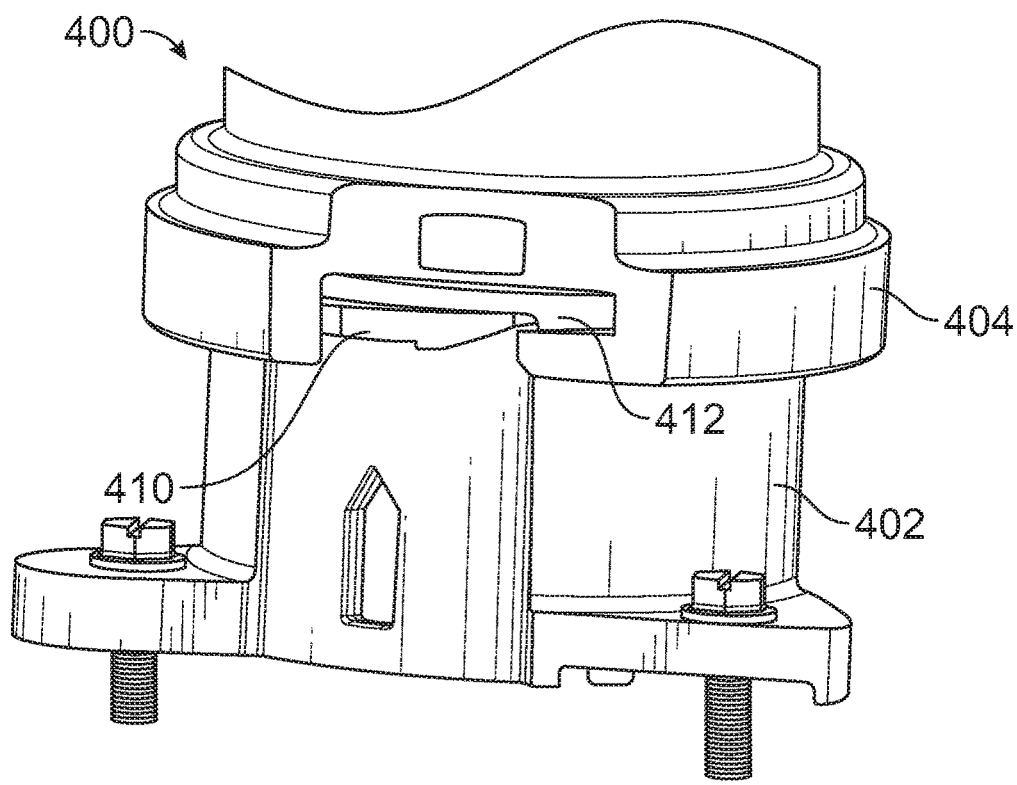
FIG. 5A and FIG. 5B illustrate partially cut isometric views of the connection mechanism of FIG. 4, wherein a hood of the connection mechanism is partially cut.
Figure 5B:
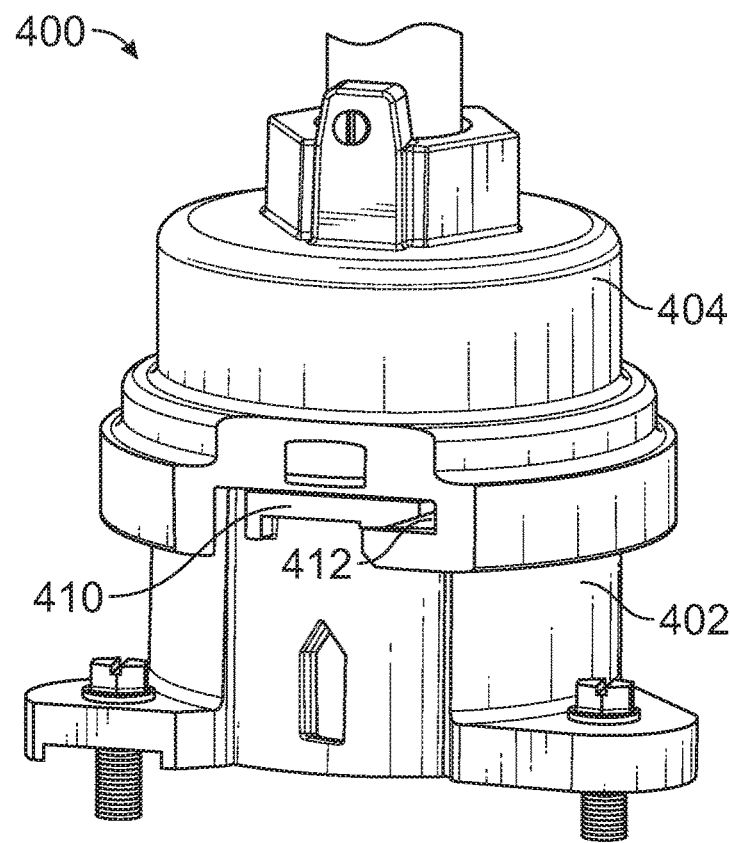

FIG. 5A and FIG. 5B illustrate partially cut isometric views of the connection mechanism 400. The operative configuration involved in achieving the connection between the adaptor 402 and the hood 404 is now explained with reference to FIG. 5A and FIG. 5B. The connection mechanism 400 comprises a plurality of bayonet tabs 410 configured on the first element 402. A plurality of bayonet slots 412, engageable with the plurality of bayonet tabs 410, are configured on the second element 404, wherein the plurality of bayonet tabs 410 are aligned with the plurality of bayonet slots 412, subsequent to which, the first element 402 is partially rotated with respect to the second element 404 to facilitate the reception of the plurality of bayonet tabs 410 within the plurality of bayonet slots 412, thereby providing a connection between the first element 402 and the second element 404.

In another embodiment, the plurality of bayonet slots 412 can be configured on the first element 402, and the plurality of bayonet tabs 410 can be configured on the second element 404.

Figure 6A:
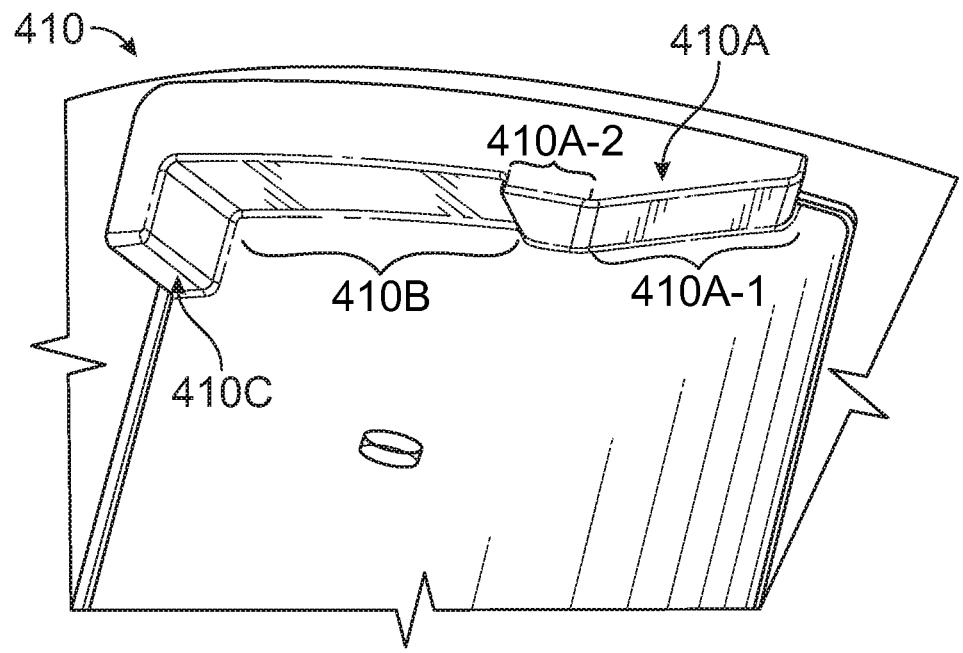
FIG. 6A and FIG. 6B illustrate isometric views of a tab of the connection mechanism of FIG. 4.
Figure 6B:
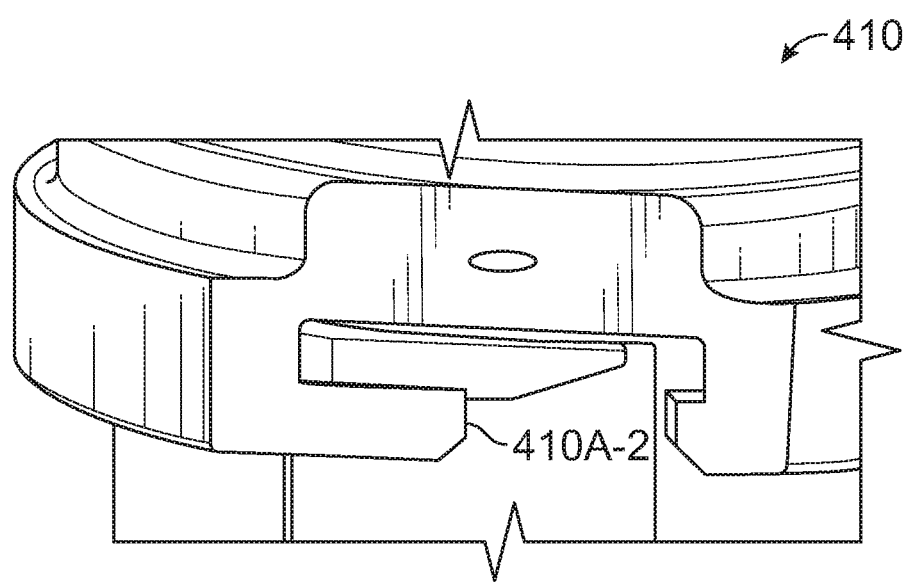

Referring to FIG. 6A and FIG. 6B, the plurality of bayonet tabs 410 has a first portion 410A having a partly tapered profile. A second portion 410B extends from the first portion 410A and has a rectangular profile. A third portion 410C extends from the second portion 410B and has a rectangular profile, wherein the width of the third portion 410C is greater than the width of the second portion 410B so as to provide a stopper feature to the tab. The stopper feature optimally blocks the rotation of the adaptor with respect to the hood once a desired fitment is achieved between the tabs and the slots. In another embodiment, only one tab of plurality of bayonet tabs 410 has a third portion 410C, while the remaining tabs of the plurality of bayonet tabs 410 have only the first portion 410A and the second portion 410B.

The partly tapered profile of the first portion 410A is defined by an inclined portion 410A-1 and a stepped portion 410A-2 extending from the inclined portion 410A-1. The stepped portion 410A-2 provides a locking feature to the first element 402 which prevents the anti-rotation of the first element 402 (adaptor) due to vibrations, thereby ensuring the safety of the lighting fixture after installation. The locking feature provided by the stepped portion 410A-2 is better understood with reference to FIG. 6B.

In another embodiment, an angle by which one of the first element 402 and the second element 404 is partially rotated with respect to the remaining one of the first element and the second element ranges from 25° to 50°. In a preferred embodiment, this angle is 40°. The partial rotation of 40° replaces the threaded connection of the conventional mechanisms 100, 200. More specifically, a human operator is required to rotate the LED matrix housing 304 (seen in FIG. 3) by 40° instead of rotating the LED matrix housing 304 by 360° eight to ten times. As such, the effort associated with the mounting of the LED matrix housing 304 onto the mounting conduit pipe 302 is significantly reduced. Furthermore, such partial rotation of the adaptor 402 with respect to the hood 404 also reduces the probability of twisting of cables as compared to that in the conventional mechanism 100, 200.

In another embodiment, an angle taper of the first portion 410A with respect to a longitudinal axis of the tab ranges from 5° to 30°. In a preferred embodiment, this angle is 20°.

In another embodiment, the first element 402 is the adaptor coupled to the LED matrix housing 304 and extending therefrom.

In another embodiment, the second element 404 is the hood configured on an operative end of the mounting conduit pipe 302 (seen in FIG. 3), wherein the hood is configured to receive the adaptor, thereby facilitating connection between the LED matrix housing and the mounting conduit.

Figure 7:
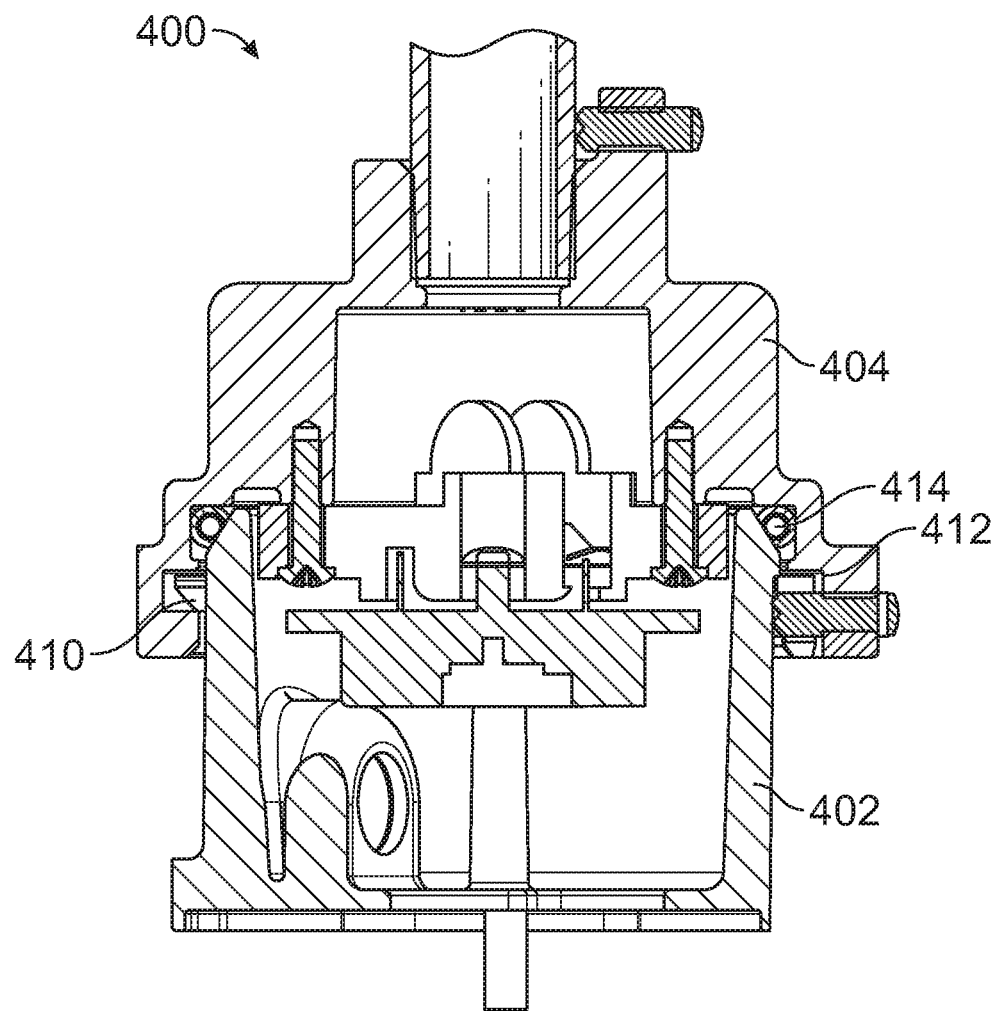
FIG. 7 illustrates a sectional view of the connection mechanism of FIG. 4.
Figure 8:
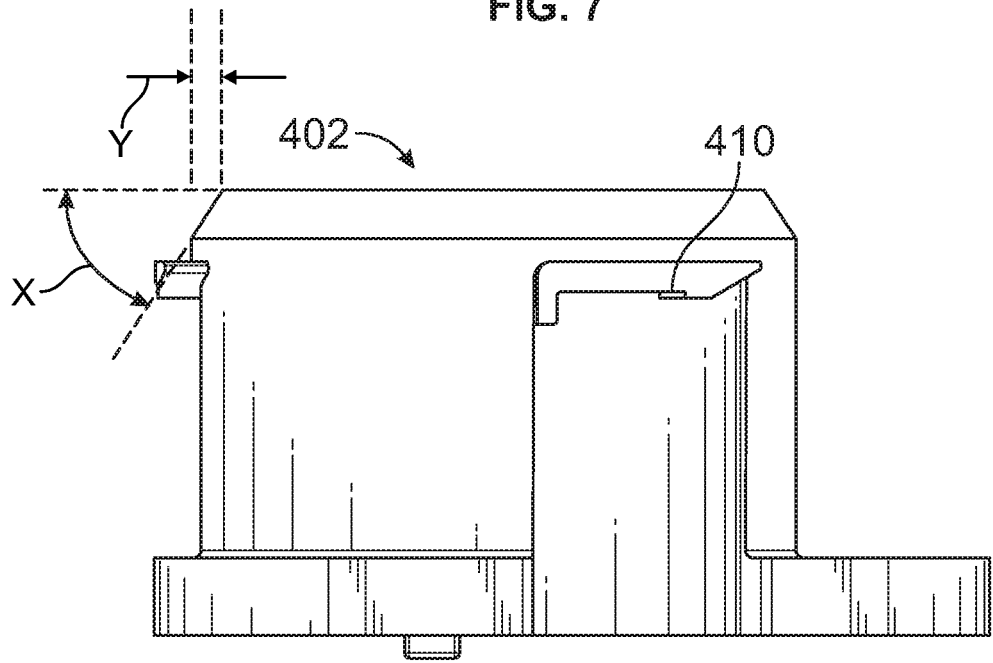
FIG. 8 illustrates a front view of an adaptor of the connection mechanism of FIG. 4.

Reference is now given to FIG. 7 and FIG. 8. As seen in FIG. 7, the connection mechanism 400 further includes a gasket 414 disposed operatively between the hood 404 and the adaptor 402. The gasket 414 is of silicone based rubber. In another embodiment, the gasket 414 can be of neoprene or latex. In order to accommodate the gasket 414 between the adaptor 402 and the hood 404, the operative top edge of the adaptor 402 is chamfered. In an embodiment, the angle of chamfer "X" ranges from 53° to 58°. In a preferred embodiment, the angle of chamfer "X" is 57.8° and a width "Y" is 0.170 inch.

Although the connection mechanism 400 of the present disclosure has been described as a means to provide a connection between the mounting conduit pipe 302 and the LED matrix housing 304, the application of the connection mechanism 400 is not limited to the mounting of lighting fixtures. The connection mechanism 400 of the present disclosure can be used to replace a threaded connection in various applications.

TECHNICAL ADVANCES

The present disclosure described herein above has several technical advantages including, but not limited to, the realization of a connection mechanism that:

reduces the effort associated with the mounting of lighting fixtures as compared with the conventional connection mechanisms; and does not cause undesired twisting of cables.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

We claim:

1. A connection mechanism on an LED lighting fixture for connecting a first element of the LED lighting fixture to a second element of the LED lighting fixture, said connection mechanism comprising:

a plurality of bayonet tabs configured on one of said first element and said second element;

a plurality of bayonet slots engageable with said plurality of bayonet tabs, said plurality of bayonet slots configured on one of said first element and said second element that does not contain the plurality of bayonet tabs, wherein said plurality of bayonet tabs are aligned with said plurality of bayonet slots, subsequent to which, said first element is partially rotated with respect to said second element to facilitate the reception of said plurality of bayonet tabs within said plurality of slots, thereby providing a connection between said first element and said second element of the LED lighting fixture;

wherein said plurality of bayonet tabs have:

a first portion having a partly tapered profile;

a second portion extending from said first portion and having a rectangular profile; and a third portion extending from said second portion and having a rectangular profile, wherein the width of said third portion is greater than the width of said second portion;

wherein the LED lighting fixture includes a hood and an LED housing;

wherein the second element is the hood of the LED lighting fixture, the hood having an internally threaded aperture for pendant mounting to external threads of a downwardly extending conduit; and wherein the first element is an adaptor having a lower end coupled to the LED housing and extending from the LED housing; and the adaptor has an upper end adapted to be received within the hood.

2. The connection mechanism as claimed in claim 1, wherein said partly tapered profile of said first portion is defined by an inclined portion and a stepped portion extending from said inclined portion, said stepped portion providing a locking feature to one of said first element and said second element, on which said plurality of tabs is configured.

3. The connection mechanism as claimed in claim 1, wherein an angle by which one of said first element and said second element is partially rotated with respect to remaining one of said first element and said second element ranges from 25° to 50°.

4. The connection mechanism as claimed in claim 3, wherein said angle by which one of said first element and said second element is partially rotated with respect to remaining one of said first element and said second element 40°.

5. The connection mechanism as claimed in claim 1, wherein an angle of taper of said first portion with respect to a longitudinal axis of said plurality of bayonet tabs ranges from 5° to 30°.

6. The connection mechanism as claimed in claim 5, wherein said angle of taper of said first portion with respect to said longitudinal axis of said plurality of bayonet tabs is 20°.

7. A connection mechanism on an LED lighting fixture for connecting a first element of the LED lighting fixture to a second element of the LED lighting fixture, said connection mechanism comprising:
   a plurality of bayonet tabs configured on one of said first element and said second element; and
   a plurality of bayonet slots engageable with said plurality of bayonet tabs, said plurality of bayonet slots configured on one of said first element and said second element that does not contain the plurality of bayonet tabs, wherein said plurality of bayonet tabs are aligned with said plurality of bayonet slots, subsequent to which, said first element is partially rotated with respect to said second element to facilitate the reception of said plurality of bayonet tabs within said plurality of slots, thereby providing a connection between said first element and said second element;
   wherein the LED lighting fixture includes a hood and an LED housing;
   wherein the second element is the hood of the LED lighting fixture, the hood having an internally threaded aperture for pendant mounting to external threads of a downwardly extending conduit; and
   wherein the first element is an adaptor having a lower end coupled to the LED housing and extending from the LED housing; and the adaptor has an upper end adapted to be received within the hood.

8. The connection mechanism as claimed in claim 7, wherein the internally threaded aperture of the hood is configured on an operative end of the mounting conduit, said hood configured to receive said adaptor, thereby facilitating connection between said LED housing and said mounting conduit.

9. The connection mechanism as claimed in claim 8, wherein an operative top edge of said adaptor is provided with a chamfer, wherein an angle of chamfer of said chamfer ranges from 53° to 58°, said chamfer facilitates a reception of a gasket on said operative top edge operatively between said adaptor and said hood.

* * * * *